United States Patent Office 3,785,986
Patented Jan. 15, 1974

3,785,986
DENTURE CLEANER
Frederick L. Lauster, Massillon, Ohio, assignor to La Fant Research Company, Canton, Ohio
No Drawing. Filed June 28, 1972, Ser. No. 267,071
Int. Cl. C11d 7/36
U.S. Cl. 252—136                                    2 Claims

ABSTRACT OF THE DISCLOSURE

A denture cleaner is provided which is non-abrasive and is highly effective for quickly and easily removing stains and tartar deposits from dentures embodying plastic or porcelain teeth and other conventional materials used in dentures. The cleaner is effective for cleaning both full and removable partial dentures, as well as for polishing gold or chromium alloy clasps and removable orthodontic and other oral dental appliances. The cleaner also has high stability under conditions involving both high and low temperatures.

---

This invention relates generally to denture cleaners.

A primary object of the invention is to provide a non-abrasive denture cleaner, which is effective to quickly and easily remove stains and tartar deposits from dentures embodying plastic or porcelain teeth and other denture materials.

Another object of the invention is to provide a denture cleaner of the character described, which is effective to clean both full and removable partial dentures, as well as to polish gold or chromium alloy clasps and removable orthodontic oral or dental appliances.

A further object of the invention is to provide a denture cleaner of the character described, which has great stability under conditions involving both high and low temperatures.

Other objects and advantages of the invention will become apparent during the course of the following description of the denture cleaner.

The denture cleaner, in accordance with the invention, consists of the following ingredients, in the percentage proportions by weight indicated:

|  | Percent by weight | |
|---|---|---|
|  | Range | Preferred |
| Water | 20–24 | 22.10 |
| Sodium phosphate, dibasic | 3.6–4.4 | 4.00 |
| Phosphoric acid (85%) | 22.00–26.80 | 24.41 |
| Glycerin | .9–1.1 | 1.00 |
| Stannic oxide | .45–.55 | .50 |
| BTC 2125M–50% Active | .225–.275 | .25 |
| Triton X–102 | 42.3–51.7 | 47.00 |
| Blue dye 1% solution | .225–.275 | .24 |
| Peppermint perfume—Givaudan W–4567 | .45–.55 | .50 |
| Total | 100 | 100 |

Sodium phosphate, dibasic, also known as DSP; disodium phosphate; hydrosodium phosphate, and disodium orthophosphate, (a) $Na_2HPO_4$; (b) $Na_2HPO_4 \cdot 2H_2O$; (c) $Na_2HPO_4 \cdot 7H_2O$; (d) $Na_2HPO_4 \cdot 12H_2O$, is available in the form of translucent crystals or white powder, soluble in water. The crystal or granular form is used in this formulation. Its function or use in this denture cleaner is to buffer the phosphoric acid and to help neutralize any possible caustic effect of the acid.

Phosphoric acid ($H_3PO_4$), is also known as orthophosphoric acid, and is a clear, colorless, sparkling liquid or a transparent crystalline solid, depending on the concentration and temperature. At ordinary atmospheric temperature (20° C.), the 50% and 75% strengths are mobile liquids, the 85% strength is of a syrupy consistency, while the 100% acid is in the form of crystals, soluble in water. An 85% strength is preferred, because it is of a technical grade, and is more readily available and safer to work with for commercial production. Its function in the present denture cleaner is to provide the necessary acid properties for proper denture cleaning.

Glycerin, also known as glycerol, and glycyl alcohol $C_3H_5(OH)_3$, is a clear, colorless, or pale yellow, odorless, syrupy liquid, having a sweet, warm taste, and soluble in water. Its function or use in the present denture cleaner is to help protect the tissue from burns.

Stannic oxide, also known as stannic anhydride; tin peroxide; stannic acid; flowers of tin, tin ash, and tin anhydride $SnO_2$, or $SnO_2 \cdot nH_2O$, is a white powder, anhydrous or containing variable amounts of water. It is insoluble in water. One of its uses is as a polishing powder for steel; hence its adaptability, in the present denture cleaner, as a polishing material for dentures embodying metallic parts.

BTC 2125 M, 50% active, is a biostat available under this trademark from Onyx Chemical Company, of Jersey City, N.J. It consists of the following ingredients, in the percentage proportions by weight indicated.

| Active ingredients: | Percent |
|---|---|
| n-Alkyl (60% $C_{14}$, 30% $C_{16}$, 5% $C_{12}$, 5% $C_{18}$) dimethyl benzyl ammonium chlorides | 25 |
| n-Alkyl (68% $C_{12}$, 32% $C_{14}$) dimethyl ethylbenzyl ammonium chlorides | 25 |
| Water | 50 |
|  | 100 |

It has bactericidal and sanitizing activity, which are particularly desirable in this denture cleaner.

Triton X-102 is the trademark of octyl phenoxy polyethoxy ethanol containing 12–13 moles of ethylene oxide. It is a biodegradeable liquid, anhydrous water-soluble nonionic detergent and surfactant. It is a uniquely effective solubilizing agent, or hydrotope, is particularly useful in cleaning metal parts of dentures, and has good foaming characteristics.

The Blue Dye 1% solution is available as FD & C Blue #1—Certified Brilliant Blue F.C.F.—from Atlas Colors on their formulation sheet, H. Kohnstamm & Co., Inc., New York, N.Y. It is compatible with the BTC 2125 M. This gives the denture cleaner a distinctive, pleasing, and readily recognizable or identifiable color, although other compatible dyes may be used.

The peppermint perfume is preferred, for its pleasing odor and taste, and is available as Givaudan W–4567, although other perfumes may be used, instead.

The aforesaid denture cleaner is preferably prepared in the following manner:

(1) A vessel is filled with the proportion of water indicated.

(2) The sodium phosphate, dibasic, is added to the water with good agitation.

(3) The phosphoric acid is added very slowly, with slow mixing or gentle agitation.

(4) The glycerin, stannic oxide, BTC 2125 M, and Triton X-102 are separately mixed together, and this mixture is heated to a temperature of about 125°–150° F., after which it is added to the mixture of (1), (2) and (3) above.

(5) The perfume which is an acid stable perfume is added to and mixed with the separate mixture in (4) above, before the latter is added to the mixture of (1), (2) and (3).

(6) The dye, which is an acid stable dye, is slowly added to and mixed with the final mixture.

The denture cleaner, as thus prepared, is preferably packaged in plastic containers.

The cleaner is normally used by applying it to the denture, and brushing it over the denture with a water-dampened brush, for 30 seconds or more, after which the denture is thoroughly rinsed with water.

For removal of heavy tartar and stains accumulated over years, the cleaner, in an amount about the size of a quarter, is placed on the dry denture, and rubbed over the areas desired, after which the denture is immersed in an amount of warm water sufficient to just cover the denture. After about 15 minutes, the denture is further cleaned by use of the normal procedure described in the preceding paragraph. This entire procedure is then repeated until tartar and strain are removed, after which a normal 30 second cleaning may be used.

The denture cleaner may also be packaged in an aerosol container, which contains a compatible aerosol propellant, enabling the cleaner to be sprayed onto the denture, and then brushed onto the denture, after which the denture is rinsed with water.

Another method of using the denture cleaner is to mix the ingredients, minus the water, with a suitable organic binder, and then compress the mixture into the form of a tablet or wafer, which can be dropped into a glass of water, the denture placed in the glass, and permitted to remain in the glass overnight.

It is thus seen that I have provided a denture cleaner which is non-abrasive, and is highly effective for quickly and easily removing stains and tartar deposits from dentures embodying plastic or porcelain teeth, and other materials conventionally used in making dentures.

It is also seen that I have provided a denture cleaner which is effective to clean both full and removable partial dentures, as well as to polish gold or chromium alloy clasps and removable orthodontic oral or dental appliances.

It is further seen that I have provided a denture cleaner of great stability, under conditions involving both high and low temperatures.

It is understood that slight changes may be made in the formula or composition of the denture cleaner as described, without departing from the spirit of the invention or the scope of the subjoined claims.

Having thus described my invention, I claim:

1. A denture cleaner consisting of from 20 to 24% by weight of water, from 3.6 to 4.4% of sodium phosphate, dibasic, from 22 to 26.80% of phosphoric acid of 85% strength, from .9 to 1.1% of glycerin, from .45 to .55% of stannic oxide, from .225 to .275% of a product consisting of

| | Percent |
|---|---|
| n-Alkyl (60% $C_{14}$, 30% $C_{16}$, 5% $C_{12}$, 5% $C_{18}$) dimethyl benzyl ammonium chlorides | 25 |
| n-Alkyl (68% $C_{12}$, 32% $C_{14}$) dimethyl ethylbenzyl ammonium chlorides | 25 |
| Water | 50 | from 42.3 to 51.7% of octyl phenoxy polyethoxy ethanol containing 12–13 moles of ethylene oxide, from .225 to .275% of a dye solution, and from .45 to .55% of a perfume.

2. A denture cleaner consisting of about 22.10% by weight of water, about 4% of sodium phosphate, dibasic, about 24.41% of phosphoric acid (85% strength), about 1% of glycerin, about .50% of stannic oxide, about .25% of a product consisting of

| | Percent |
|---|---|
| n-Alkyl (60% $C_{14}$, 30% $C_{16}$, 5% $C_{12}$, 5% $C_{18}$) dimethyl benzyl ammonium chlorides | 25 |
| n-Alkyl (68% $C_{12}$, 32% $C_{14}$) dimethyl ethylbenzyl ammonium chlorides | 25 |
| Water | 50 | about 47% of octyl phenoxy polyethoxy ethanol containing 12–13 moles of ethylene oxide, about .24% of a dye solution, and about .50% of a perfume.

References Cited

UNITED STATES PATENTS

| | | | |
|---|---|---|---|
| 1,345,819 | 7/1920 | Wolfe | 252—144 |
| 2,362,487 | 11/1944 | Hopkins | 252—131 X |
| 2,593,259 | 4/1952 | Brissey et al. | 252—136 |
| 3,004,897 | 10/1961 | Shore | 252—527 X |
| 3,268,455 | 8/1966 | Bryce et al. | 252—142 |
| 3,355,392 | 11/1967 | Cantor et al. | 252—99 |
| 3,518,343 | 6/1970 | Welsh et al. | 252—99 X |

OTHER REFERENCES

Bennett: The Chemical Formulary, vol. XIII, Chemical Publishing Co., Inc., New York, 1967, p. 74.

The Condensed Chemical Dictionary, 7th ed., Reinhold Publishing Corp., New York, 1939, p. 390.

LEON D. ROSDOL, Primary Examiner

H. A. PITLICK, Assistant Examiner

U.S. Cl. X.R.

252—142, 145